United States Patent [19]

Kuhajek et al.

[11] 3,887,498

[45] June 3, 1975

[54] METHOD FOR REGENERATION OF CATION EXCHANGE RESINS AND FOR REMOVAL OF IRON DEPOSITS THEREFROM

[75] Inventors: Eugene J. Kuhajek, Crystal Lake; Howard W. Fiedelman; Gordon H. Tibbitts, both of Woodstock, all of Ill.

[73] Assignee: Morton-Norwich Products, Inc., Chicago, Ill.

[22] Filed: Mar. 12, 1973

[21] Appl. No.: 339,611

[52] U.S. Cl.............................. 260/2.2 R; 210/32
[51] Int. Cl............................................ B01d 15/06
[58] Field of Search............ 210/32, 30, 38; 252/87, 252/175, 181, DIG. 11; 260/2.2 R

[56] References Cited
UNITED STATES PATENTS

| | | |
|---|---|---|
| 2,769,787 | 11/1956 | Diamond............................. 210/32 |
| 3,099,521 | 7/1963 | Arensberg........................... 252/175 |

FOREIGN PATENTS OR APPLICATIONS 45-17781   6/1970   Japan

OTHER PUBLICATIONS

"Chelating Agent Quantity Calculator", Chas. Pfizer & Co., Inc., April 1966.
"General Information on Chelation", Technical Bulletin, Hampshire Chemical Division of W. R. Grace & Co., May 1960, pp. 9A–12A.

Primary Examiner—Samih N. Zaharna
Assistant Examiner—Ivars Cintins
Attorney, Agent, or Firm—Jack Axelrood

[57] ABSTRACT

A composition for preparing an aqueous solution for regenerating and removing iron from a cation exchange resin which has become exhausted and iron-fouled as the result of use in softening hard water, the composition comprising a major proportion of sodium chloride and a minor proportion of a source of nitrilotriacetic acid; and a method of regenerating said resin.

4 Claims, 2 Drawing Figures

METHOD FOR REGENERATION OF CATION EXCHANGE RESINS AND FOR REMOVAL OF IRON DEPOSITS THEREFROM

BACKGROUND OF THE INVENTION

1. Field of the Invention

Conventional water treating devices make use of cation exchange resins. Hard water to be treated for removal of various ions is brought into contact with the resin which contains readily exchangeable hydrogen or sodium ions. As the hard water is passed through a bed of the resin, some of the ions causing the hardness, such as calcium and magnesium ions, are removed from the water by the cation exchange resin and are replaced by hydrogen or sodium ions therefrom. When the capacity of the cation exchange resin for removing these hardness-causing ions has been substantially reduced or exhausted, the resin must be regenerated. This is usually done by treatment with brine (an aqueous solution of sodium chloride) which restores the exchange capacity of the resin by replacing hardness-causing ions with sodium ions, thus producing an ionizable sodium salt form of the resin. The regenerated resin then functions on what is referred to as the sodium cycle. Alternatively, the exhausted resin may be regenerated with acid, thereby replacing hardness-causing ions with hydrogen ions, in which case the resin then functions on the hydrogen cycle.

Among the materials causing hardness are iron ions and iron compounds, hereinafter referred to collectively as "iron." Cation exchange resins have a high affinity for iron, hence soluble iron from water becomes strongly attached to active sites in the resin. In addition to the exchange action, soluble iron in water tends to form a rust coating on the surface of the resin beads. Accordingly, wherever iron is present in a water supply, it accumulates both in and on the beads of ion exchange resin used to soften the water, thereby fouling such resins. When the resin beads are thus fouled their exchange properties are significantly diminished. In order to restore the exchange properties of an iron-fouled resin so that it may function properly, the iron must be removed. Removal of even a small portion of the iron opens new sites on the resin so that the ion exchange necessary for the treatment of water may take place.

2. Description of the Prior Art

Conventionally the removal of iron deposits from exhausted ion exchange resins is accomplished by contacting the exhausted iron-fouled resin with a regenerating solution containing sodium chloride and an iron-solubilizing compound. Two of the most widely used iron-removing or solubilizing compounds are sodium hydrosulfite and sodium bisulfite. A combination of sodium hydrosulfite and bisulfite, as disclosed in U.S. Pat. No. 3,183,191, has also been employed for this purpose. Japanese Pat. No. 45-17781 discloses a combination of sodium bisulfite and the disodium salt of nitrilotriacetic acid in sodium chloride brine as a regenerant and iron-removing composition for exhausted ion exchange resins. U.S. Pat. No. 2,769,787 teaches combinations of sodium chloride and a solid water soluble acid selected from the group consisting of citric, tartaric, sulfamic, sulfosalicyclic, malic, maleic, succinic and itaconic acids. Although these latter acids are effective to a degree for the intended purpose, their iron-removing efficiency is of a low order of magnitude. Accordingly, it would be desirable to provide a composition for preparing an aqueous solution for regenerating and simultaneously removing iron deposits from exhausted ion exchange resins, and a method for said regeneration and iron removal, which composition and method are more effective and efficient with respect to iron removal than prior art methods.

It is therefore an object of this invention to provide an improved method of regenerating exhausted ion exchange resins and simultaneously removing iron therefrom which method does not impair the original softening capacity of the resin through repeated cycles of softening, cleaning and regeneration.

The fulfillment of these and other related objects of this invention may be more readily appreciated by reference to the following specification, examples, and appended claims.

SUMMARY OF INVENTION

Broadly, this invention relates to a composition for preparing an aqueous solution for regenerating and removing iron from a cation exchange resin which has been used for softening hard water and has become substantially exhausted and iron-fouled by reason thereof, said composition comprising a major proportion of sodium chloride and a minor proportion of a source of nitrilotriacetic acid. This invention also relates to a method of regenerating a cation exchange resin which has been used for softening hard water and which has become iron-fouled and substantially exhausted by reason thereof, which method comprises contacting said resin with an aqueous solution containing a major proportion of sodium chloride and a minor proportion of a source of nitrilotriacetic acid.

The present process is applicable to those cation exchange resins capable of operating on the sodium cycle and to the commercially available styrene resins comprising a sulfonated copolymer of styrene and divinylbenzene.

In this invention, nitrilotriacetic acid may be used per se, or it may be formed in situ by the combination of a sodium salt of nitrilotriacetic acid with a water soluble acidic donor, the quantity and acidity of the acidic donor being sufficient to provide a pH of an aqueous brine solution of said combination of not more than about 3 pH units. Although any convenient source of water may be employed for the preparation of the aqueous brine solution of said combination, it is recognized that local sources of water contain varying concentrations of bicarbonate ion which acts as a buffering agent and thereby affects pH values. Therefore, to provide a standard frame of reference for the determination of the pH referred to herein, the pH measurement is made on an aqueous brine solution of said combination prepared from deionized or distilled water. Some acidic donors which are suitable are, for example, but not limited to, sodium bisulfate and sulfamic acid.

It was found that the aforesaid combination of sodium chloride and nitrilotriacetic acid, when formed into an aqueous solution, has the capability of removing iron much more effectively than the combinations disclosed in U.S. Pat. No. 2,769,787, a fact which is demonstrated more fully in the following examples. For instance, as little as about 0.17% by weight of nitrilotriacetic acid, on a sodium chloride basis, solubilizes twice as much iron as the same quantity of citric acid. Increasing the quantity of nitrilotriacetic acid causes an even greater increase in the iron removal capability of the compositions of the present invention when compared to those of U.S. Pat. No. 2,769,787. In addition, as is demonstrated in the following examples, the compositions of the present invention are much more effective for removing iron than is the combination of sodium bisulfite and the disodium salt of nitrilotriacetic acid taught by Japanese Pat. No. 45-17781.

It has been established amply in the literature that sodium chloride is effective in regenerating exhausted cation exchangers, the usual quantity of salt being of the order of magnitude of about 6 pounds per cubic foot of resin. Conveniently the regenerating process is accomplished by the use of a 5–10% salt solution which is passed through the resin bed at a rate sufficient to effect regeneration thereof in about 30 minutes. As previously stated, the inclusion in the brine of nitrilotriacetic acid, or a combination of the sodium salt thereof and a water soluble acidic donor significantly enhances the regeneration process by facilitating the removal of iron deposits from the exhausted resin. In one preferred embodiment of the process of the present invention, the process comprises contacting the exhausted resin with an aqueous solution containing a major proportion of sodium chloride and, on a sodium chloride basis, from about 0.1% to about 1.4% by weight of nitrilotriacetic acid or its equivalent formed by the reaction of a sodium salt thereof with an acidic donor. The quantity and acidity of the acid donor should be sufficient to cause the pH of an aqueous brine solution of said combination of a sodium salt of nitrilotriacetic acid and acidic donor to be not more than about 3 pH units. Although concentrations of nitrilotriacetic acid greater than about 1.4% are effective in removing iron, the expense of exceeding this concentration, when compared with the benefits, makes it impracticable from an economic point of view.

For a more complete understanding of the present invention, reference is now made to the following specific examples illustrating the novel composition and process of this invention.

DESCRIPTION OF THE PREFERRED EMBODIMENTS

EXAMPLE 1

Figure 1:
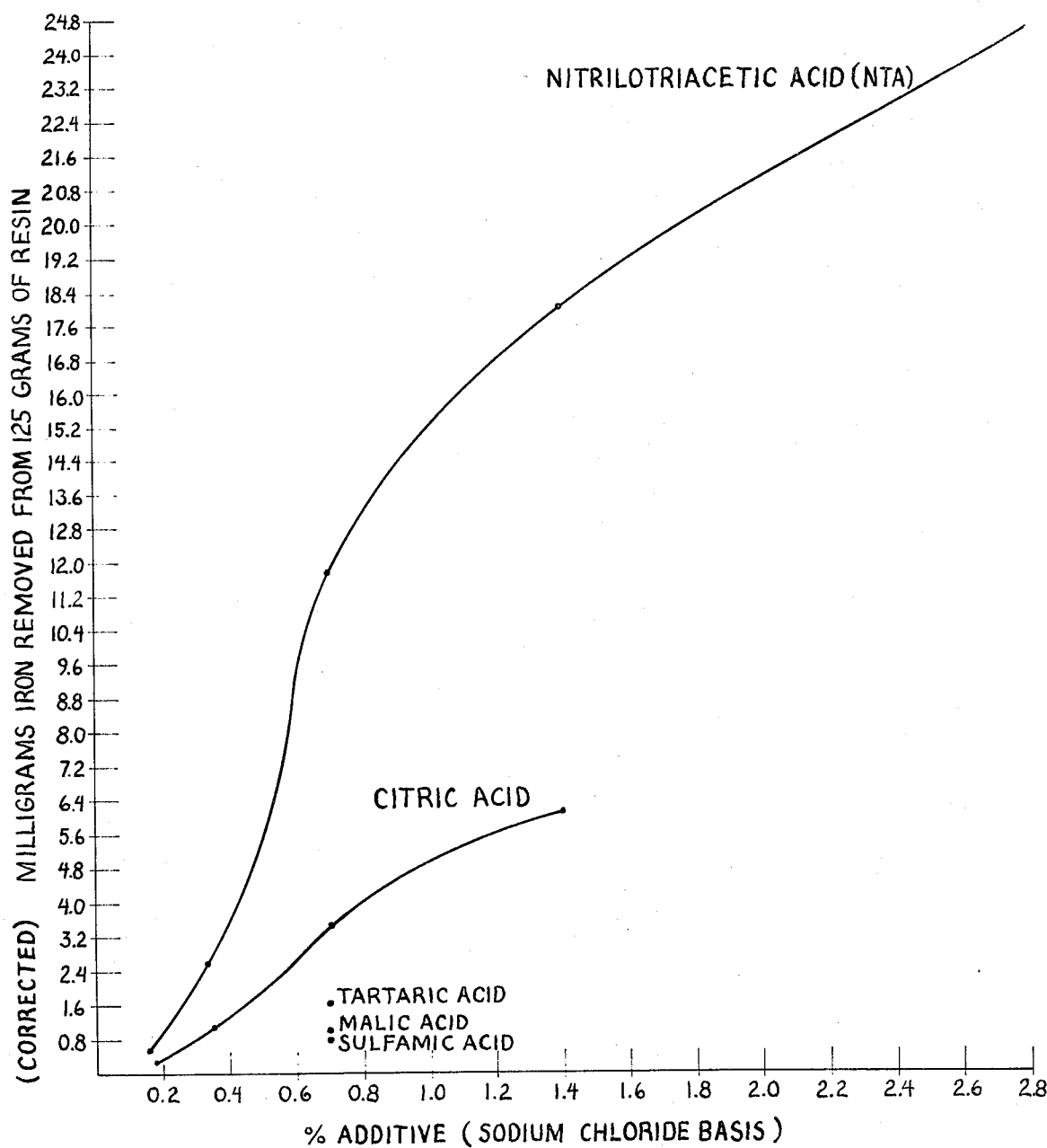

To compare the iron-removing properties of nitrilotriacetic acid with that of the acids disclosed and claimed in U.S. Pat. No. 2,759,787, the following experiment was conducted:

A 125 gram portion of an ion exchange resin which had become exhausted and badly fouled with iron through usage for water softening was placed in a suitable glass column. To regenerate this resin there was passed therethrough 650 milliliters of a 10% brine (sodium chloride) solution containing 0.175% of nitrilotriacetic acid (hereinafter "$H_3NTA$") on a sodium chloride basis. The quantity of sodium chloride used in the regenerating solution is in excess of that required for complete regeneration of the exhausted resin. This procedure was repeated on another 125 gram portion of the same resin except that the brine contained 0.175% by weight of citric acid instead of $H_3NTA$. As a control, another 125 gram portion of the same resin was treated with 650 milliliters of the same brine solution except that it contained no additives.

After regeneration, a portion of each brine solution was analyzed for iron content to determine total iron removed. The results were as follows:

| Additive in 10% Brine Solution (NaCl Basis) | Mg. of Fe Removed Total | Corrected[1] | % Fe Removed by $H_3NTA$ when compared to Citric Acid[2] |
|---|---|---|---|
| Control — no additive | 0.3 | — | |
| 0.175% Citric Acid | 0.6 | 0.3 | |
| 0.175% $H_3NTA$ | 0.9 | 0.6 | 200 |

[1] Corrected for 0.3 milligram of iron removed by control.
[2] $\dfrac{\text{Mg. Fe Removed by } H_3NTA}{\text{Mg. Fe Removed by Citric Acid}} \times 100$

EXAMPLES 2–4

The procedure of Example 1 was repeated except that comparisons were made between 0.35% citric acid and 0.35% $H_3NTA$, 0.70% citric acid and 0.70% $H_3NTA$ and 1.40% citric acid and 1.40% $H_3NTA$. The results were as follows:

| Example | Additive in 10% Brine Solution (NaCl Basis) | Mg. of Fe Removed Total | Corrected[1] | % Fe Removed by $H_3NTA$ when compared to Citric Acid[2] |
|---|---|---|---|---|
| 2 | (a) 0.35% citric acid | 1.4 | 1.1 | |
|   | (b) 0.35% $H_3NTA$ | 2.9 | 2.6 | 236 |
| 3 | (a) 0.70% citric acid | 3.8 | 3.5 | |
|   | (b) 0.70% $H_3NTA$ | 12.1 | 11.8 | 337 |
| 4 | (a) 1.40% citric acid | 6.2 | 5.9 | |
|   | (b) 1.40% $H_3NTA$ | 18.4 | 18.1 | 307 |

[1] Corrected for 0.3 milligram of iron removed by control (see Example 1).
[2] $\dfrac{\text{Mg. Fe Removed by } H_3NTA}{\text{Mg. Fe Removed by Citric Acid}} \times 100$

EXAMPLES 5–7

The procedure of Example 1 was repeated except that 0.70% of malic acid, 0.70% tartaric acid and 0.70% sulfamic acid were substituted respectively for citric acid. The results were as follows:

| Example | Additive in 10% Brine Solution (NaCl Basis) | Mg. of Fe Removed Total | Corrected[1] | % Fe Removed by $H_3NTA$ when compared to Test Acid[2] |
|---|---|---|---|---|
| 5 | (a) 0.70% malic acid | 1.3 | 1.0 | |
|   | (b) 0.70% $H_3NTA$ | 12.1 | 11.8 | 1180 |
| 6 | (a) 0.70% tartaric acid | 2.0 | 1.7 | |
|   | (b) 0.70% $H_3NTA$ | 12.1 | 11.8 | 694 |
| 7 | (a) 0.70% sulfamic acid | 1.1 | 0.8 | |
|   | (b) 0.70% $H_3NTA$ | 12.1 | 11.8 | 1475 |

[1] Corrected for 0.3 milligram of iron removed by control (see Example 1).

[2] $\frac{\text{Mg. Fe Removed by } H_3NTA}{\text{Mg. Fe Removed by Test Acid}} \times 100$ The foregoing results demonstrate that the use of nitrilotriacetic acid in brine provides an iron-removing solution that is vastly more effective, i.e., from twice to fifteen times as effective as the acids disclosed by the prior art.

These results are depicted graphically in FIG. 1 where the number of milligrams of iron removed is plotted along the ordinate and the percent additive (nitrilotriacetic acid, citric acid, tartaric acid, malic acid and sulfamic acid) is plotted along the abscissa.

EXAMPLE 8

A portion (125 grams) of an ion exchange resin which had become exhausted and badly fouled with iron through repeated use is softening water was placed in a suitable column. This resin was different from and was iron-contaminated to a greater degree than the resin employed in Examples 1–7. To regenerate this resin there was passed therethrough 650 milliliters of a 10% sodium chloride solution containing 0.1217 gram of $H_3NTA$, equivalent to 0.175% $H_3NTA$ on a sodium chloride basis. The quantity of sodium chloride used in the regenerating solution is in excess of that required for complete regeneration of the exhausted resin. The pH of the brine solution was determined prior to use. After regeneration, a portion of each brine solution was analyzed for iron content to determine total iron removed. As a control, another 125 grams portion of the same resin was treated with 650 milliliters of a 10% brine solution containing no additives.

The results obtained were as follows:

| Example | Additive in 10% Brine Solution (NaCl Basis) | Brine Solution pH | Mg. of Fe Removed Total | Corrected[1] | Mg.Fe Removed Per 1% $H_3NTA$ Equivalent |
|---|---|---|---|---|---|
| 8 | No additive | 6.30 | 0.8 | — | |
|   | 0.175% $H_3NTA$ | 2.30 | 15.0 | 14.2 | 81.1 |

EXAMPLES 9–12

The procedure of Example 8 was repeated except that the following concentrations of nitrilotriacetic acid were employed as indicated:

Example 9 — 0.35% on NaCl basis
Example 10 — 0.70% on NaCl basis
Example 11 — 1.40% on NaCl basis In addition, the procedure was repeated (Example 12) using 0.70% citric acid (NaCl basis) for comparative purposes. The results were as follows:

| Example | Additive in 10% Brine Solution (NaCl Basis) | Brine Solution pH | Mg. of Fe Removed Total | Corrected | Mg. Fe Removed Per 1% $H_3NTA$ Equivalent |
|---|---|---|---|---|---|
| 9 | 0.35% $H_3NTA$ | 2.15 | 28.6 | 27.8 | 79.4 |
| 10 | 0.70% $H_3NTA$ | 1.95 | 46.5 | 45.7 | 65.3 |
| 11 | 1.40% $H_3NTA$ | 1.80 | 64.5 | 63.7 | 45.5 |
| 12 | 0.70% Citric Acid | 2.10 | 13.0 | 12.2 | | comparing the iron removed (45.7 mg.) by 0.70% $H_3NTA$ with that removed (12.2 mg.) by 0.70% citric acid, we find that $H_3NTA$ removed 375% (45.7/12.2 × 100) as much iron as citric acid. This figure substantially corroborates the increased iron removal of $H_3NTA$ over citric acid (337%) found in Example 3 using a resin which was much less heavily iron-fouled than the resin employed in Example 8–12.

EXAMPLE 13

To demonstrate that nitrilotriacetic acid may be provided by a combination comprising a sodium salt of nitrilotriacetic acid and an acidic donor, the procedure of Example 8 was repeated except that a composition consisting of 1.08 g. of the monohydrate trisodium salt of $H_3NTA$ (hereinafter $Na_3NTA.H_2O$) and 1.41 g. $NaHSO_4$ (which composition provides the equivalent of 0.70% $H_3NTA$ on a NaCl basis) was employed per liter of brine in accordance with the following equation:

$$Na_3NTA \cdot H_2O + 3NaHSO_4 \rightarrow H_3NTA + 3Na_2SO_4 + H_2O$$

From this equation it is seen that 1.41 g. $NaHSO_4$ is the stoichiometric quantity required for reaction with 1.08 g. $Na_3NTA \cdot H_2O$. On a NaCl basis, the concentrations are 1.01% $Na_3NTA \cdot H_2O$ and 1.32% $NaHSO_4$.

For control purposes, the procedure was repeated using 1.41 g. $NaHSO_4$ per liter of brine (1.32% $NaHSO_4$ on a NaCl basis) without any $Na_3NTA \cdot H_2O$ being present.

The results obtained were as follows:

| Additive in 10% Brine Solution (NaCl Basis) | Brine pH | Mg. Fe Removed Actual | Mg. Fe Removed Corrected | Mg. Fe Removed Per 1% $H_3NTA$ Equivalent |
| --- | --- | --- | --- | --- |
| 1.01% $Na_3NTA \cdot H_2O$ <br> 1.32% $NaHSO_4$ | 1.95 | 42.0 | 41.2 | 58.9 |
| 1.32% $NaHSO_4$ | 1.70 | 15.5 | 14.7 | — |

It is seen from the foregoing that the quantity of iron removed is 280%(41.2/14.7 × 100) as much in the instance where the nitrilotriacetic acid moiety is present when compared to the iron removal capability of the acidic donor ($NaHSO_4$) alone.

EXAMPLES 14–17

The procedure of Example 13 was repeated except that the pH of the combination of $Na_3NTA \cdot H_2O$ and $NaHSO_4$ employed was increased to 2.50, 3.00, 4.00 and 5.00 respectively, by decreasing the quantity of $NaHSO_4$ to 0.787%, 0.510%, 0.455% and 0.436% respectively on a NaCl basis. The results obtained were as follows:

| Example | Additive in 10% Brine Solution (NaCl Basis) | Brine pH | Mg. Fe Removed Actual | Mg. Fe Removed Corrected | Mg. Fe Removed Per 1% $H_3NTA$ Equivalent |
| --- | --- | --- | --- | --- | --- |
| 14 | 1.01% $Na_3NTA \cdot H_2O$ <br> 0.787% $NaHSO_4$ | 2.50 | 31.0 | 30.2 | 43.2 |
| 15 | 1.01% $Na_3NTA \cdot H_2O$ <br> 0.510% $NaHSO_4$ | 3.00 | 15.6 | 14.8 | 21.1 |
| 16 | 1.01% $Na_3NTA \cdot H_2O$ <br> 0.455% $NaHSO_4$ | 4.00 | 11.7 | 10.9 | 15.6 |
| 17 | 1.01% $Na_3NTA \cdot H_2O$ <br> 0.436% $NaHSO_4$ | 5.00 | 8.4 | 7.6 | 10.9 |

Figure 2:
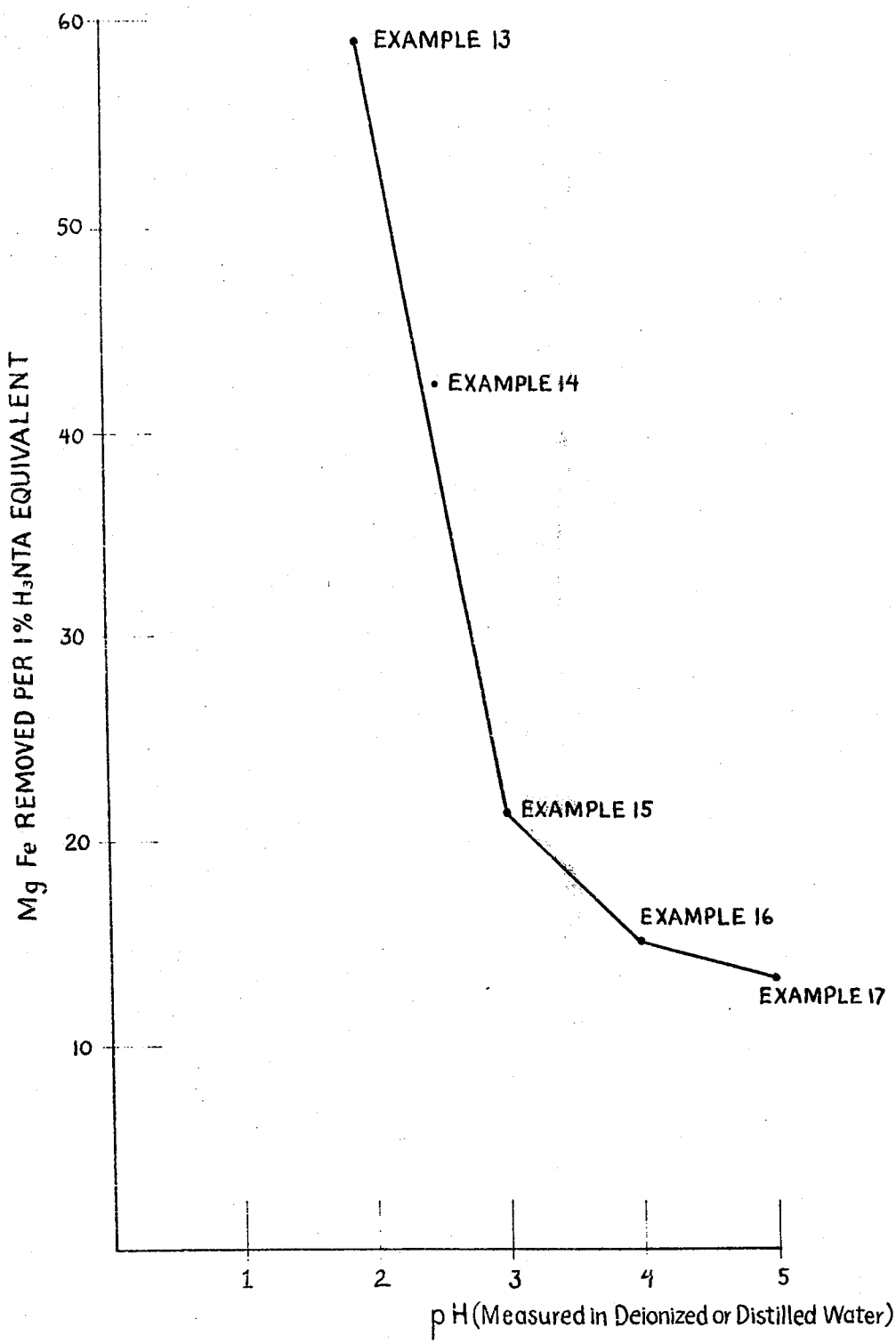

The results of Examples 13–17 are depicted in the graph of FIG. 2 where the quantity of mg. of iron removed per 1% $H_3NTA$ equivalent is plotted along the ordinate, and the pH of the $Na_3NTA$-$NaHSO_4$ combination is plotted along the abscissa. As is evident from the graph, the quantity of iron removed by the $Na_3NTA$-$NaHSO_4$ combination decreases as the pH increases. The quantity of acid donor employed should be sufficient to provide a pH of the aqueous solution of the combination of not more than about 3 pH units for maximum iron removal efficiency. Although a pH up to about 5 for the combination of $Na_3NTA$ and $NaHSO_4$ is operable to remove iron from an iron-fouled resin, the most effective and efficient iron removal occurs where the pH is no more than about 3 pH units.

EXAMPLE 18

Japanese Pat. No. 45-17781 teaches the use of a combination of the disodium salt of nitrilotriacetic acid (hereinafter $Na_2HNTA$) and sodium bisulfite ($NaHSO_3$) as an iron-removing composition. Inasmuch as there is no readily available commerical source of $Na_2HNTA$, a combination of $Na_3NTA \cdot H_2O$ and $H_3NTA$ was employed to yield $Na_2HNTA$ according to the following equation:

$$2Na_3NTA + H_3NTA \rightarrow 3Na_2HNTA$$

The example set forth in this patent provides that 2.4 g. of sodium bisulfite ($NaHSO_3$) and 1.6 g. of $Na_2HNTA$ be added to 200 ml. of 10% NaCl solution for regenerating and cleaning 200 ml. of an ion exchange resin. This is equivalent to 7.8 g. $NaHSO_3$ per 650 ml. and 5.2 g. $Na_2HNTA$ per 650 ml.; 7.8 g. $NaHSO_3$ per 650 ml. is equivalent to 7.12 g. $Na_2S_2O_5$ per 650 ml. according to the following equation:

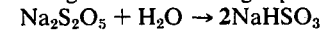

$$Na_2S_2O_5 + H_2O \rightarrow 2NaHSO_3$$

A combination of 1.41 g. $H_3NTA$ and 4.06 g. $Na_3NTA \cdot H_2O$ provides 5.2 g. of $Na_2HNTA$. Therefore the procedure of Example 8 was repeated using 650 ml. of a 10% brine of the following composition:

7.12 g. $Na_2S_2O_5$
1.41 g. $H_3NTA$
4.06 g. $Na_3NTA \cdot H_2O$ which composition contains the NTA moiety at a level equivalent to 6.07% $H_3NTA$ (on a NaCl basis).

The results obtained were as follows:

| Brine pH | Mg. Fe Removed Actual | Mg. Fe Removed Corrected | Mg. Fe Removed Per 1% $H_3NTA$ Equivalent |
| --- | --- | --- | --- |
| 3.85 | 64.0 | 63.2 | 10.4 |

The following tabulation compares this iron removal per 1% $H_3NTA$ equivalent with that of Examples 13–17.

| Example | Mg. Fe Removed Per 1% H₃NTA Equivalent | Actual Increase by the Combination of the Present Invention over that of the Japanese Patent[1] | % Increase[2] |
| --- | --- | --- | --- |
| 13 | 58.9 | 48.5 | 466 |
| 14 | 43.2 | 32.8 | 315 |
| 15 | 21.1 | 10.7 | 103 |
| 16 | 15.6 | 5.2 | 50 |
| 17 | 10.9 | 0.5 | 5 |
| 18 | 10.4 | — | |

[1] Value in Column I less 10.4
[2] Obtained by dividing each value in Column II by 10.4 and multiplying by 100.

EXAMPLE 19

The procedure of Example 18 was repeated with the exception that 650 ml. of a 10% brine of the following composition (equivalent to 0.70% $H_3NTA$, on a NaCl basis) was employed:

0.821 g. $Na_2S_2O_5$
0.162 g. $H_3NTA$
0.467 g. $Na_3NTA \cdot H_2O$

The results were as follows:

| Brine pH | Mg. Fe Removed | | Mg. Fe Removed Per 1% H₃NTA Equivalent |
| --- | --- | --- | --- |
| | Actual | Corrected | |
| 3.95 | 19.5 | 18.7 | 26.7 |

Comparing this result to that of Example 10 (whose 0.70% $H_3NTA$ was used), it is seen that the present invention provides a significant improvement in iron removal as indicated by the following data:

| Example | Mg. Fe Removed Per 1% H₃NTA Equivalent |
| --- | --- |
| 10 | 65.3 |
| 19 | 26.7 |

This amounts to 245% Fe removed by $H_3NTA$ alone when compared to the composition of the Japanese Patent.

What is claimed is:

1. A method of regenerating a cation exchange resin which has been used for softening hard water and which has become iron-fouled and substantially exhausted by reason thereof, which method comprises contacting said resin with an aqueous solution containing about 10% by weight of sodium chloride and based on said sodium chloride at least about 0.175% by weight of nitrilotriacetic acid, the pH of said aqueous solution containing said sodium chloride and said nitrilotriacetic acid being less than about 3 pH units.

2. The method of claim 1 wherein the nitrilotriacetic acid is derived from a combination of a sodium salt of nitrilotriacetic acid and an acidic donor, the quantity and acidity of said acidic donor being sufficient to provide said pH of less than about 3 pH units.

3. The method of claim 2 wherein the acidic donor is sodium bisulfate.

4. The method of claim 2 wherein the acidic donor is sulfamic acid.

* * * * *